United States Patent
Mylonas (10) Patent No.: US 11,391,638 B2
(45) Date of Patent: Jul. 19, 2022

(54) METHOD FOR MEASURING AUTOMOBILE HORSEPOWER AND ITS APPLICATION ON CHASSIS DYNAMOMETERS

(71) Applicant: Dionysios Mylonas, Athens (GR)

(72) Inventor: Dionysios Mylonas, Athens (GR)

(*) Notice: Subject to any disclaimer, the term of this patent is extended or adjusted under 35 U.S.C. 154(b) by 0 days.

(21) Appl. No.: 17/186,024

(22) Filed: Feb. 26, 2021

(65) Prior Publication Data
US 2021/0310886 A1 Oct. 7, 2021

Related U.S. Application Data

(63) Continuation-in-part of application No. 15/949,019, filed on Apr. 9, 2018, now Pat. No. 10,935,461.

(51) Int. Cl.
| G01L 3/24 | (2006.01) |
| G01M 15/04 | (2006.01) |
| F02B 75/02 | (2006.01) |

(52) U.S. Cl.
CPC ............... *G01L 3/24* (2013.01); *F02B 75/02* (2013.01); *G01M 15/044* (2013.01); *F02B 2075/027* (2013.01)

(58) Field of Classification Search
CPC ............................... G01M 15/044; G01L 3/24
See application file for complete search history.

(56) References Cited

U.S. PATENT DOCUMENTS

| 3,693,426 A * | 9/1972 | Little | G01L 3/24 |
| | | | 73/862.192 |
| 7,643,912 B2 * | 1/2010 | Heffington | G07C 5/085 |
| | | | 701/1 |
| 2004/0215379 A1 * | 10/2004 | Pangerl | G01L 3/26 |
| | | | 701/31.4 |

FOREIGN PATENT DOCUMENTS

DE 102017200604 A1 * 7/2018 ........ B60W 40/1005

OTHER PUBLICATIONS

S. Brol, "Application of direct acceleration measurement in powertrain testing," 2013 International Symposium on Electrodynamic and Mechatronic Systems (SELM), 2013, pp. 29-30, doi: 10.1109/SELM.2013.6562964. (Year: 2013).*

P. Tanák, et al., "Smart Phone Brake Testing," 2019 6th International Conference on Advanced Control Circuits and Systems (ACCS) & 2019 5th International Conference on New Paradigms in Electronics & information Technology (PEIT), 2019, pp. 242-246, doi: 10.1109/ACCS-PEIT48329.2 (Year: 2019).*

* cited by examiner

*Primary Examiner* — Jennifer Bahls (57) ABSTRACT

The present invention provides a more accurate device and method for measuring automobile horsepower, specifically the internal combustion engine, ICE horsepower at the crankshaft, or the electric motor(s') horsepower, or the combined ICE and electric motor(s') horsepower. It applies to automobiles that do not incorporate, or can disengage, regenerative braking, RGB. The proposed device and method measures horsepower in real road test conditions, through the utilization of an accelerometer that performs measurements of the automobile velocity, acceleration and deceleration, whereas the method provided may be also applied to chassis dynamometers, resulting into a more accurate horsepower measurement by such dynamometers.

4 Claims, 2 Drawing Sheets

METHOD FOR MEASURING AUTOMOBILE HORSEPOWER AND ITS APPLICATION ON CHASSIS DYNAMOMETERS

CROSS REFERENCE TO RELATED APPLICATIONS

The present application claims priority from U.S. patent application Ser. No. 15/949,019 filed on Apr. 9, 2018 with the U.S. Patent and Trademark Office which is incorporated herein by reference in its entirety.

BACKGROUND

The present invention provides a method for measuring the horsepower of internal combustion engines and electric motors powering automobiles using an accelerometer.

Internal combustion engine, ICE horsepower, i.e. horsepower at the crankshaft, is commonly measured by in-house chassis dynamometers that usually incorporate rollers, i.e. large cylinders that are rotated by the torque applied through the automobile's wheels during the acceleration phase, in which a certain gear is engaged and full throttle is applied for the total range of speeds («rev range», expressed in revolutions per minute/rpm) of the engine. The acceleration phase is immediately followed by the deceleration («coast-down») phase, whereby neutral gear is usually engaged, therefore the powertrain and accordingly the drivetrain is essentially disengaged and the engine is left to decelerate back to the lowest possible engine speed. The torque measured, using these methods, is evidently the one delivered by the wheels, not by the crankshaft of the automobile's engine.

The chassis dynamometers calculate then the wheel horsepower by applying a common formula that relates horsepower to torque and, subsequently, the horsepower at the crankshaft by applying proprietary algorithms that calculate, but do not measure as the drivetrain is essentially disengaged, drivetrain losses based on the power losses measured during the deceleration phase and add them to the calculated, per above, wheel horsepower.

This measurement method has a number of disadvantages, such as heavy fatigue of the engine, since the rotating cylinders exert a larger resistance to rotation than the resistance encountered by the wheels in real road conditions. This has as a consequence the revving of the engine at high speeds (revolutions per minute, rpm) for a longer time period than it would be required in road conditions, leading to the abovementioned engine fatigue.

Also, during chassis dynamometer measurements, the engine does not deliver its torque/power as it would on the road, something that creates uncertainty regarding the accuracy of the measurement especially taking into account the possible intervention of the automobile's Engine Control Unit, ECU in order to protect the engine by lowering its power output switching to "safe mode", something that actually happens quite often.

Also, during chassis dynamometer measurements the engine is not ventilated as it would be if on the road. This has a dual drawback: first, further fatigue of the engine (and associated equipment) operating at higher temperatures than normally, and second and most importantly, the feeding of the intake system with less air and accordingly less fuel than on the road, directly resulting into an underestimation of the engine's torque and accordingly horsepower. The latter drawback is particularly important for several modern high-performance engines which have a forced intake system that compresses air, something similar to a certain extent to the widely applied in current motorcycles «RAM-air» intake system.

Other methods have been suggested, which do not use an in-house, chassis dynamometer to measure the engine horsepower. Such methods measure the automobile's velocity and acceleration in real road conditions and calculate torque from horsepower, however, such methods lack in accuracy. This is because they first measure wheel horsepower through acceleration of the automobile, again engaging a certain gear and applying full throttle for the whole rev range of the engine. They usually do not incorporate a deceleration phase, or, in one case in which they do, this phase is performed with the gearbox declutched. Then, in order to calculate horsepower at the crankshaft, they either apply proprietary algorithms embedding certain assumptions, or, more simply, assume a certain drivetrain loss percentage depending on the automobile's transmission system (e.g., manual or automatic gearbox, 2-wheel or 4-wheel drive, etc). Thus, they do not actually measure engine horsepower but, instead, they estimate it based on measured wheel horsepower.

The present invention provides a method and a device applied in real road conditions that are more accurate than existing methods.

SUMMARY OF THE INVENTION

An aspect of the present invention relates to a method for measuring automobile horsepower, in real road conditions. The method may include using a mobile device employing GPS and an accelerometer, such as a smartphone, steadily positioned into the automobile. The method is characterized in that it incorporates two phases, i.e. an acceleration phase and a deceleration phase and takes measurements during both. In addition, both phases are executed with the same gear of the automobile's gearbox engaged. In an embodiment, the method calculates the automobile horsepower, $P_e$ by the following equation:

$$P_e = mv[dv/dt(\text{acc}) + (1-K)dv/dt(\text{dec})] + K[\eta\, mg\, v + \tfrac{1}{2} d\, C_x S_f v^3] \tag{1}$$

wherein m is the total mass of the automobile including passengers and cargo, v is the automobile velocity, dv/dt(acc) is the automobile acceleration during the acceleration phase, dv/dt(dec) is the automobile deceleration during the deceleration phase, t is time, K is a dimensionless empirical factor between 0 and 1 representing pumping losses at full release of the accelerator pedal as a fraction of powertrain losses, η is the rolling friction coefficient, g is the gravitational constant, d is the density of air at the ambient conditions where the measurement takes place, $C_x$ is the aerodynamic resistance coefficient of the automobile and $S_f$ is the frontal area of the automobile.

For values of K approaching zero, i.e. when pumping losses at full release of the accelerator pedal are negligible or non-existent, as is the case of fully electric automobiles, equation (1) reduces to the following simplified equation:

$$P_e = mv[dv/dt(\text{acc}) + dv/dt(\text{dec})] \tag{14}$$

For an ICE or hybrid automobile having a four-stroke engine not incorporating the cylinder deactivation technology, equation (1) is transformed to the following equation:

$$P_e = \text{ME}\, mv[dv/dt(\text{acc}) + dv/dt(\text{dec})] \tag{21}$$

wherein ME is the mechanical efficiency of the automobile's powerplant. The ME values for different powerplants have as follows:

naturally aspirated gasoline engine: 0.85
turbocharged gasoline engine: 0.91
supercharged gasoline engine: 0.89
naturally aspirated diesel engine 0.89
turbocharged diesel engine: 0.94
hybrid, naturally aspirated gasoline engine: 0.87
hybrid, turbocharged gasoline engine: 0.94
hybrid, supercharged gasoline engine: 0.93
hybrid, turbocharged diesel engine: 0.96

In an embodiment, the method includes using a smartphone incorporating GPS and an accelerometer and a suitable mobile application using the aforementioned equations for measuring the automobile horsepower, with the smartphone being steadily mounted into the automobile to be measured. Prior to the measurement, the user may enter into the mobile application the values of the parameters m, K, η, d, $C_x$, $S_f$, and the velocity achieved by the automobile per 1,000 rpm at the gear to be selected, as may be needed. The accelerometer performs the measurements of v and dv/dt (acc) first under full throttle acceleration of the automobile and then v and dv/dt(dec) under deceleration of the automobile having fully released the accelerator pedal. Finally, the mobile application calculates based on equation (1) or equation (14) or equation (21), depending on the case, engine horsepower as a function of time and engine speed.

The method of the present invention improves significantly the accuracy of the automobile horsepower measurement. The method of the present invention measures the horsepower in real road conditions and unlike heretofore methods and devices, it incorporates data from a deceleration phase of the automobile allowing the actual calculation of drivetrain losses for specific cases, as will be shown in the next section. Unlike the present invention, currently applied methods do not incorporate a deceleration phase and cannot calculate such drivetrain losses. Some prior art methods may estimate such drivetrain losses based on various assumptions but are generally not accurate.

The present invention method allows an automobile owner to measure the horsepower of the automobile without the need to take the car to a mechanic's shop. Moreover, it is more economical than visiting an in-house chassis dynamometer, and it is easily repeatable, a characteristic that provides to the user a more thorough view of the automobile's horsepower by performing multiple measurements at will.

Another aspect of the invention is that it is also suitable for measuring horsepower for electric vehicles, EVs that incorporate an operating mode during which regenerative braking, RGB is disengaged.

The concept of mechanical efficiency may be also applied to certain popular chassis dynamometers measuring horsepower and torque at the wheels, rendering thus possible the calculation of horsepower and torque not only at the wheels, but also at the crankshaft/electric rotor shaft(s), or, more generally, the calculation of the total automobile horsepower, $P_e$. and torque $T_e$. According to this embodiment the torque, $T_e$ developed by the automobile is given by the following equation:

$$T_e = ME(T_{acc} + T_{dec}), \quad (25)$$

wherein $T_{acc}$ and $T_{dec}$ are the torque values measured on the chassis dynamometer's rollers during acceleration and deceleration, respectively.

BRIEF DESCRIPTION OF THE DRAWINGS

These and other features and advantages of the present invention will become apparent to those skilled in the art to which the present invention pertains from the following detailed description of specific embodiments of the invention in reference with the following figures.

DETAILED DESCRIPTION OF THE INVENTION

Various embodiments of the present invention are described below in more detail. We note, however, that the present invention may be embodied in different other embodiments, forms and variations thereof and should not be construed as being limited to the embodiments set forth herein. Rather, the described embodiments are provided so that this disclosure will be thorough and complete, and will fully convey the various aspects and features of the present invention to those skilled in the art to which this invention pertains.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present.

It will be further understood that the terms "comprises," "comprising," "includes," and "including" when used in this specification, specify the presence of the stated elements and do not preclude the presence or addition of one or more other elements.

It is also noted, that in some instances, as would be apparent to those skilled in the relevant art, a feature or element described in connection with one embodiment may be used singly or in combination with other features or elements of another embodiment, unless otherwise specifically indicate.

The present invention provides a more accurate method for measuring the ICE and electric motor(s) horsepower of automobiles.

In contrast to the in-house chassis dynamometers that measure the performance of the automobile under conditions that simulate to a certain extent road conditions, the proposed invention measures horsepower in real road test conditions, through the utilization of an accelerometer that performs measurements of the automobile velocity, acceleration and deceleration. Unlike other similar applications that use an accelerometer in real road test conditions, it also incorporates the phase of deceleration immediately after the phase of acceleration, achieving as will be shown below correctness from a scientific point of view, and significantly higher accuracy from a practical point of view.

The present invention provides an improved, more accurate method for measuring the horsepower of automobiles. The method is particularly suitable for measuring the horsepower of an internal combustion engine (ICE) at the crankshaft, or the (combined) electric motor(s') horsepower, or the combined ICE and electric motor(s') horsepower.

In contrast to the in-house, chassis dynamometers that measure the performance of the automobile under conditions that simulate to a certain extent road conditions, the present invention method measures horsepower in real road test conditions, through the utilization of GPS and an accelerometer that performs measurements of the automobile velocity, acceleration and deceleration as a function of time in real road conditions and a mobile application calculating the automobile horsepower based on the accelerometer measurements and one or more equations.

Unlike other methods that use an accelerometer in real road test conditions, the present invention method includes a deceleration phase and a respective measurement, immediately after an acceleration phase and the respective measurement, both performed with the same gear in the automobile's gearbox.

This allows a more accurate calculation of the powertrain losses and the calculation of the automobile horsepower, $P_e$ using the following equation:

$$P_e = mv[dv/dt(\text{acc}) + (1-K)dv/dt(\text{dec})] + K[\eta \, mg \, v + \tfrac{1}{2}d \, C_x S_f v^3],$$

wherein: m is the total mass of the automobile including passengers and cargo, v is the automobile velocity, dv/dt(acc) is the automobile acceleration during the acceleration phase, dv/dt(dec) is the automobile deceleration during the deceleration phase, t is time, K is a dimensionless empirical factor between 0 and 1 representing pumping losses at full release of the accelerator pedal as a fraction of powertrain losses, $\eta$ is the rolling friction coefficient, g is the gravitational constant, d is the density of air at the ambient conditions where the measurement takes place, $C_x$ is the aerodynamic resistance coefficient of the automobile and $S_f$ is the frontal area of the automobile.

For various classes of modern automobiles for which pumping losses at full release of the accelerator pedal are negligible or non-existent, the previous equation can be simplified to the following equation, $$P_e = mv[dv/dt(\text{acc}) + dv/dt(\text{dec})],$$

which is appropriate, among other cases, for measuring the horsepower of certain all-electric cars.

For an ICE or hybrid automobile having a four-stroke engine not incorporating the cylinder deactivation technology, equation is transformed to the following equation:

$$P_e = \text{ME} \, mv[dv/dt(\text{acc}) + dv/dt(\text{dec})]$$

wherein ME is the mechanical efficiency of the automobile's powerplant. The ME values for different powerplants have as follows:
naturally aspirated gasoline engine 0.85
turbocharged gasoline engine: 0.91
supercharged gasoline engine: 0.89
naturally aspirated diesel engine 0.89
turbocharged diesel engine: 0.94
hybrid, naturally aspirated gasoline engine: 0.87
hybrid, turbocharged gasoline engine: 0.94
hybrid, supercharged gasoline engine: 0.93
hybrid, turbocharged diesel engine: 0.96

In an embodiment, the proposed method employs the use of a suitable software program incorporating the disclosed equations run on a mobile device possessing or operatively coupled to an accelerometer. In an embodiment, the software can be loaded as an application in a smartphone mobile phone device.

The principle of operation of the present invention will now be explained in more detail assuming an automobile traveling, specifically rolling without slipping, on a flat and horizontal road under no wind conditions. In order to apply the method, a gear is engaged and full throttle acceleration is applied from the lowest to the highest allowable engine's rpm.

The individual forces applied on the automobile, excluding its weight and the road surface resistance which are mutually canceled out, are the following:

$F_w$ is the force applied by the combined ICE and/or electric motor(s) and applied after drivetrain losses to the wheels, $F_f$ is the rolling friction force and $F_a$ is the aerodynamic "drag" force. The resultant force, $\Sigma F(\text{acc})$ that accelerates the automobile is, in absolute values' terms, given by the below equation:

$$\Sigma F(\text{acc}) = F_w - F_f - F_a, \text{equiv. to } F_w = \Sigma F(\text{acc}) + F_f + F_a \quad (2)$$

Based on Newtonian physics, the resultant force $\Sigma F(\text{acc})$ is related to the produced acceleration a as follows:

$$\Sigma F(\text{acc}) = ma = m[dv/dt(\text{acc})] \quad (3)$$

wherein m is the vehicle mass including passengers and cargo, v the velocity and t the time. For practical applicability purposes of the present method, we assume that m is equal to the «apparent mass» of the automobile, i.e., the mass including the «equivalent mass» of the rotating parts.

In addition, the following equations give the values of the other two forces, $F_f$ and $F_a$:

$$F_f = \eta mg \quad (4)$$

wherein $\eta$ is the coefficient of rolling friction, assumed as constant (i.e. independent of the velocity v) and g the gravitational constant, and $$F_a = 1/2 \, dC_x S_f v^2 \quad (5)$$

wherein d is the air density at the existing ambient condition during measurement, $C_x$ is the drag coefficient, assumed as constant, and $S_f$ is the frontal area of the automobile.

Substituting in (2) for the values given by (3), (4) and (5) we get:

$$F_w = m[dv/dt(\text{acc})] + \eta \, mg + \tfrac{1}{2} d \, C_x S_f v^2 \quad (6)$$

The power $P_w$ developed by the combined engine and/or electric motor(s) and applied after drivetrain losses to the wheels, is by definition given by:

$$P_w = F_w v \quad (7)$$

Substituting in (7) for the $F_w$ equivalent given by (6), we get the equation for the combined engine and/or electric motor(s) power to the wheels:

$$P_w = mv[dv/dt(\text{acc})] + \eta \, mg \, v + \tfrac{1}{2} d \, C_x S_f v^3 \quad (8)$$

Equation (8) gives the wheel horsepower of the automobile as a function of velocity v and acceleration dv/dt(acc), both being able to be calculated by an accelerometer. Parameters m, η, $C_x$ and $S_f$ are constants in general given by the automobile manufacturer and the tires' manufacturer. Especially as regards d, it is given by easily accessible tables of physical properties of ambient air. Therefore, the device can be prepared for the measurement by entering predetermined values for the abovementioned parameters into the device. The method may calculate using equation (8) the automobile's wheel horsepower.

According to the method of the present invention, during the second phase of the measurement that immediately follows the acceleration phase, i.e., during deceleration with the throttle/accelerator pedal fully released, the automobile is left to slow down with the gear selected during the acceleration phase.

Another important feature, besides incorporating the deceleration phase in contrast to other applications in real road conditions, of the present invention is that the automobile is decelerated in real road conditions in the same gear used during acceleration. By contrast, according to current state of the art in in-house chassis dynamometers, deceleration is performed with the neutral gear in the gearbox, a procedure which is broadly referred to as «coast-down», with one exception mentioned later. Also, in one real road conditions' method that incorporates a deceleration phase, deceleration is performed with the gearbox declutched.

The individual forces now applied on the automobile are all forces resistant to its movement, specifically a) the forces exerted by the powertrain (we exclude the traction battery from the definition of «powertrain» for the purposes of this invention, as explained below), i.e., in the general case: internal engine resistant forces mainly expressed as pumping losses (broadly referred to as «engine braking»), drivetrain forces and RGB forces, all three resulting in a total powertrain resistant force denoted as $F_l$, b) the rolling friction force, $F_f$, and c) the aerodynamic «drag» force, $F_a$. These forces are related in terms of absolute values by the following Newtonian equation:

$$\Sigma F(dec) = F_l + F_f + F_a = m[dv/dt(dec)] \quad (9)$$

wherein dv/dt(dec) is the deceleration caused by the resultant force ΣF(dec) of the above detailed forces, during the deceleration phase.

Substituting as above for the individual forces and solving for $F_l$, we get the following equation:

$$F_l = m[dv/dt(dec)] - \eta\, mg - \tfrac{1}{2} d\, C_x S_f v^2 \quad (10)$$

Finally, the power losses, $P_l$ that are consumed by the powertrain, by definition equal to the product of $F_l$ and v, are given by the following equation:

$$P_l = mv[dv/dt(dec)] - \eta mgv - 1/2\, dC_x S_f v^3 \quad (11)$$

Therefore, the power at the wheels and the power losses at the powertrain, are respectively given by the two equations (8) and (11), summarized in the following table:

| | |
|---|---|
| $P_w$ = m v [dv/dt(acc)] + η mg v + ½ d $C_x$ $S_f$ $v^3$ | (acceleration phase) |
| $P_l$ = m v [dv/dt(dec)] − η mg v − ½ d $C_x$ $S_f$ $v^3$ | (deceleration phase) |

The present invention is particularly suitable for automobiles that do not incorporate or allow the full deactivation of RGB; such automobiles may therefore be ICE, hybrid (HEVs), or all-electric/battery (BEVs) ones, but in all such cases the powertrain, as defined above, is able to eliminate RGB losses, and encounter only pumping and drivetrain ones. It is noted at this point, that RGB losses are recovered to a large extent by the traction battery, therefore, if that latter was included in the definition of «powertrain», the «powertrain» would not encounter significant net RGB losses in any case. Reverting to the issue of pumping losses, we clarify these for the purposes of this invention as the power taken from the crankshaft necessary to drive the engine, i.e. necessary for the engine to perform the intake and exhaust pumping operations during the deceleration phase. Based on this clarification, «pumping losses» include «pure» pumping losses resulting from the pressure difference between the intake and exhaust manifolds, plus mechanical friction losses, plus losses for driving auxiliary equipment such as water and oil pumps etc. We can then formulate, based on equation (11), an equation giving only drivetrain losses, $P_d$ as follows:

$$P_d = (1-K)[mv[dv/dt(dec)] - \eta\, mg\, v - \tfrac{1}{2}d\, C_x S_f v^3] \quad (12)$$

wherein K is an empirical dimensionless factor, between 0 and 1, representing pumping losses at full release of the accelerator pedal as a fraction of total powertrain, i.e. the sum of pumping and drivetrain, losses.

The automobile horsepower, $P_e$ is, by definition, equal to the sum of wheel horsepower, $P_w$ and drivetrain losses, $P_d$:

$$P_e = P_w + P_d \quad (13)$$

Therefore, substituting in (13) for the values of $P_w$ and $P_d$ given by (8) and (12) respectively, for each value of the velocity, v we finally get equation (1):

$$P_e = mv[dv/dt(acc) + (1-K)dv/dt(dec)] + K[\eta\, mg\, v + \tfrac{1}{2}d\, C_x S_f v^3] \quad (1)$$

The above holds true under the additional assumption that the drivetrain power losses during deceleration adequately represent the drivetrain power losses during acceleration, for each engine speed (in rpm) with the selected, for the measurement, gear. This assumption is, for all practical purposes, very close to reality, although in principle the drivetrain losses during acceleration are slightly higher than the respective losses during deceleration.

Equation (1) reduces to the following simplified equation (14), for values of K approaching zero, i.e. when pumping losses at full release of the accelerator pedal are approaching zero:

$$P_e = mv[dv/dt(acc) + dv/dt(dec)] \quad (14)$$

K depends on various factors, as discussed in detail in the following paragraph.

Pumping losses are reduced when: a) the engine is a diesel one, whereby the throttle is always fully open and therefore the inlet manifold vacuum is approaching zero, b) engine operates with only some of its cylinders, i.e., having deactivated the others, at complete release of the throttle pedal, something that is a necessary condition for performing the deceleration phase incorporated in the present method, a technology that is employed by an increasing number of automobile manufacturers, whereas at least one of them, specifically a mass production manufacturer, has already adopted the deactivation of all cylinders during complete throttle lift-off eliminating thus pumping losses, c) engine displacement becomes smaller, something that is the current automotive industry trend, commonly referred to as «downsizing», and d) the automobile engine is equipped with an Exhaust Gas Recirculation, EGR valve, which allows, at full release of the throttle pedal, the intake of exhaust gases in the inlet manifold after the throttle, therefore reducing inlet manifold and in-cylinder vacuum; this technology was launched since the early 70's and is standard to all new automobiles since many years ago.

Based on the above, equation (14) is accurate for measuring the engine horsepower of certain classes of modern automobiles, mainly the ones deactivating all cylinders at complete throttle lift-off, provided, in the latter case, that the gearbox is not disengaged also. It is also accurate, maybe to a lesser extent, for measuring automobiles equipped with a small and medium-sized gasoline engine, incorporating also the technology of deactivating some, usually half, of the cylinders at complete throttle lift-off.

Moreover, the fact that this invention method measures the forces exerted on an automobile regardless of the source of the driving force, expands its scope to HEVs and BEVs, widely estimated to constitute the majority of new automobile sales by the mid-2020's; it is evident that especially BEVs do not encounter any pumping losses at full release of the accelerator pedal, but only minimal losses due to the spinning of their lightweight rotors. In these cases, it is repeated that the measurement procedure described applies to HEVs and BEVs having an operating mode that allows the electric vehicle to decelerate at full release of the accelerator pedal without any RGB and respective power losses. The horsepower figures measured may hence be a) the horsepower at the wheels, always through equation (8) and b) in the case of BEVs, where pumping losses are non-existent at full release of the accelerator pedal, the horsepower delivered by the electric motor(s) through equation (14). These would be interesting measurements when performed, for instance, at different battery charge levels; also, «tuning» of HEVs and BEVs is an already existing after-market activity, whereby the OEM controller is being substituted by a custom one.

On the other hand, general equation (1) is also valid for larger gasoline engines and older automobiles, for values of the factor K depending on the automobile to be measured.

Especially for naturally aspirated four-stroke gasoline engines, powering a large percentage of the total number of automobiles in use worldwide, SAE has provided a guideline with Standard SAE 31349. According to such guideline, if friction data are not available, as is the case for this invention method which is intended to be easily applicable, a mechanical efficiency of 85% has to be assumed. Taking such assumption as valid in the case of road tests also, it translates into the following simple relationship:

$$P_e = 85/15 P_p, \text{ equiv. to } P_p = 15/85 P_e \quad (15)$$

wherein $P_p$ are the pumping power losses.

Equation (14), which holds true in the case where RGB losses are non-existent and pumping losses at full release of the accelerator pedal are negligible or non-existent, can be easily generalized to include such pumping losses as follows:

$$P_e = mv[dv/dt(\text{acc}) + dv/dt(\text{dec})] - P_p \quad (16)$$

Substituting in (16) for the $P_p$ equivalent as given by (15) and solving for $P_e$, we get the following simplified equation:

$$P_e = 0.85 \, mv[dv/dt(acc) + dv/dt(dec)] \quad (17)$$

which is evidently valid for automobiles not incorporating the cylinder deactivation technology and as already mentioned, holds true for a large percentage of the total number of automobiles in use worldwide, therefore greatly enhancing the scope of the present invention.

It is noted at this point that, alternatively, equation (16) can be readily derived by directly adding equations (8) and (11) for each value of v, canceling out opposite terms and setting $P_l = P_d + P_p$ (it is repeated that no RGB losses are assumed for the purposes of this invention):

$$P_w + P_d + P_p = P_e + P_p = mv[dv/dt(\text{acc}) + dv/dt(\text{dec})] \quad (18)$$

It is hereby again assumed that power figures measured during a test in real road conditions adequately approximate respective figures during a «bench test» of horsepower. Therefore, equation (18) gives, in the case of an ICE not incorporating the cylinder deactivation technology, its indicated power, $P_i$, which is by definition equal to the sum of horsepower at the crankshaft, $P_e$ and pumping losses, $P_p$:

$$P_i = mv[dv/dt(\text{acc}) + dv/dt(\text{dec})] \quad (19)$$

therefore, this invention method also approximates, per equation (19), the indicated power of an ICE not incorporating the cylinder deactivation technology.

Equation (15) can be readily generalized as follows:

$$P_e = \text{ME}/(1-\text{ME})P_p, \text{ equiv. to } P_p = (1-\text{ME})/\text{ME} P_e \quad (20)$$

wherein ME is the mechanical efficiency for each engine type. Therefore, equation (17) finally becomes $$P_e = \text{ME} mv[dv/dt(acc) + dv/dt(dec)] \quad (21)$$

which holds true for all types of engines/automobiles, and is dependent on the parameter ME. For different types of powerplants, including hybrid ones, for commercially available and after-market tuned vehicles, and taking into account the pressure difference between the intake and exhaust manifolds during deceleration, the following values of ME are proposed:

turbocharged gasoline engine: 0.91
supercharged gasoline engine: 0.89
naturally aspirated diesel engine 0.89
turbocharged diesel engine: 0.94
hybrid, naturally aspirated gasoline engine: 0.87
hybrid, turbocharged gasoline engine: 0.94
hybrid, supercharged gasoline engine: 0.93
hybrid, turbocharged diesel engine: 0.96

It has to be hereto added that the above values for turbocharged gasoline and diesel engines are widely supported by relevant literature.

Summarizing, by measuring velocity and acceleration utilizing an accelerometer and knowing or making an educated guess of the abovementioned parameters, the present invention method can calculate using equation (8) the wheel horsepower and using equations (1) or (14) or (17) or (21), that latter in conjunction with the ME values, the automobile horsepower, much more accurately than heretofore methods. Unlike already existing methods and applications in real road conditions claiming to measure automobile horsepower, the present invention method incorporates a deceleration phase which allows the calculation of drivetrain losses per equation (12). Existing methods, except for one that performs deceleration with the gearbox declutched, do not incorporate a deceleration phase and cannot calculate such drivetrain losses. Existing mobile applications measure wheel horsepower and then simply estimate automobile horsepower by making assumptions for the magnitude of the drivetrain power losses.

Figure 1:
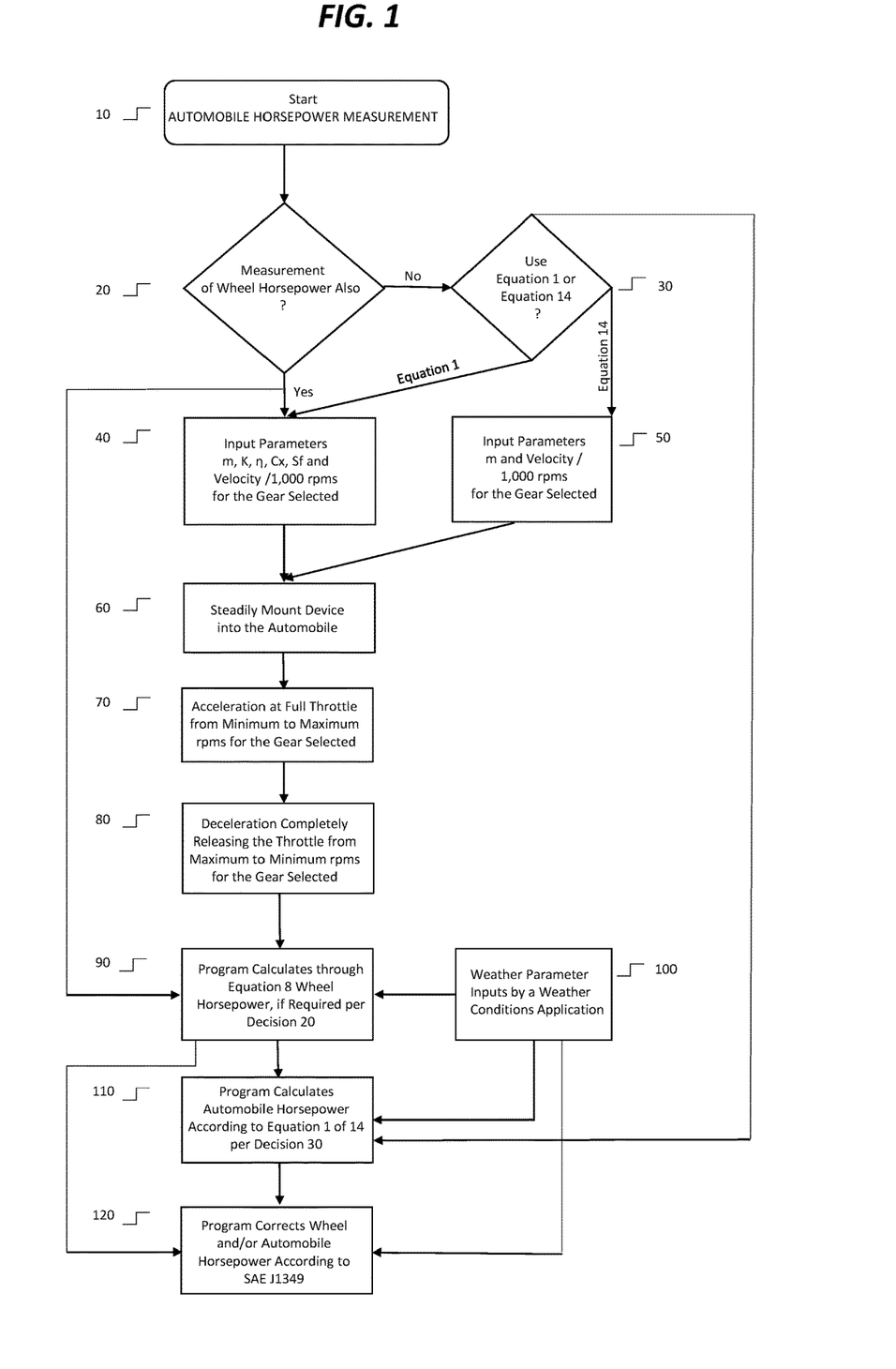
FIG. 1 is a flowchart of a method for measuring the automobile and/or wheel horsepower, according to an embodiment of the present invention.

Also, it should be noted that mechanical efficiency is not directly defined for hybrid powerplants, but it can be evidently deemed as the ratio of total/combined produced horsepower by the powerplant to the sum of a) total/combined produced horsepower by the powerplant and b) pumping losses in the powerplant's ICE. Also, all ICEs referenced below are four-stroke ones, FIG. 1 is a flowchart of a method for measuring the automobile and/or wheel horsepower, according to an embodiment of the present invention. The method includes immediately after start (Step 10), selecting measuring either both the automobile and the wheel horsepower, or only the automobile horsepower (Step 20). It is noted that the wheel horsepower may be calculated using equation (8) discussed above in detail. In addition, if the user wishes to measure only the automobile horsepower, and equations (14) or (17) are the appropriate ones, per Step 30, then only the values of m and the velocity achieved per 1,000 rpm for the gear to be selected (Step 50 instead of Step 40) may be entered into the program. The program may be a mobile device application, e.g., a smartphone application. In the specific case where the user does not wish to create a map of automobile horsepower Vs engine speed, then he/she needs to enter only the value of m as explained above and also in the below example of implementation of the invention.

Then the measuring device, such as a smartphone, is steadily mounted in the automobile to be measured (Step 60), a gear is selected and the automobile is accelerated at full throttle throughout the rev range (Step 70) and, immediately after, the throttle/gas pedal is fully released and the automobile is left to decelerate down the rev range with the gear selected during the acceleration phase (Step 80);

Finally, the program calculates the wheel horsepower, if required per Step 20 (Step 90), the automobile horsepower using the appropriate equation per Step 30 (Step 110), and corrects the above calculated horsepower figures according to SAE 31349, per standard practice (Step 120). In order to perform these calculations, the program receives inputs of the necessary weather parameters by a weather conditions mobile application (Box 100).

Figure 2:
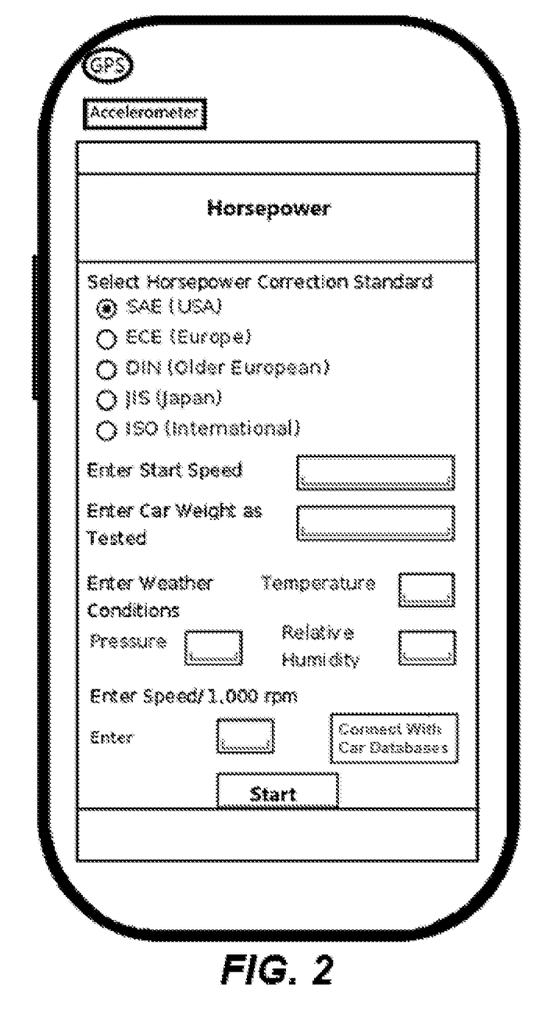
FIG. 2 is a wireframe/user interface of a method for measuring the automobile horsepower, according to an embodiment of the present invention using a smartphone that includes GPS connection, an accelerometer and a software program, such as a mobile application.

FIG. 2 is a wireframe/user interface of a method for measuring the automobile horsepower, according to an embodiment of the present invention using a smartphone. The smartphone includes GPS connection, an accelerometer and a software program, such as a mobile application. The user of the device is prompted to first select the preferred correction standard (SAE, ECE, DIN, JIS, ISO). Then, the user is prompted to enter into the application/software program the following: a) the start speed/velocity, which will be detected by the GPS, b) the car weight/mass as tested, i.e. including passengers and cargo, c) the weather conditions, i.e. ambient temperature, pressure and relative humidity, in order for the software program to calculate the appropriate correction according to the selected standard, and d) the velocity achieved by the automobile per 1,000 rpm for the gear selected for the measurement, that latter parameter needed only if the mapping of automobile horsepower Vs engine speed is required by the user. According to the embodiment shown in FIG. 2, the user is given the option to connect with online car databases to receive information for the entries b) and d). Finally, the smartphone is steadily mounted in the automobile and the measurement may start when the user pushes the "Start" virtual button.

Example of Implementation of the Invention

According to an implementation of the present invention method, equations (1), (8), (14), (17) and (21), that latter in conjunction with the ME values, can be readily applied by a device incorporating a software program that utilizes the velocity (v), acceleration (dv/dt(acc)) and deceleration (dv/dt(dec)) measurements as a function of time (t), obtained by an accelerometer also embodied in the device. For example, the device may be a mobile phone such as a smartphone that has an accelerometer and a suitable mobile application.

The method may be implemented by the following steps: Initially, the user will be prompted to enter into the program via a virtual keypad the parameters m, K, $\eta$, d, $C_x$, $S_f$ and the velocity achieved by the automobile per 1,000 rpm for the gear to be selected, the latter parameter needed only if the mapping of horsepower figures Vs engine speed is required by the user;

Then, the measuring device such as a smartphone may be steadily mounted in the automobile to be measured;

Following the above, a gear may be selected and the automobile may be accelerated at full throttle throughout the rev range. Using the first gear is not recommended due to wheel spin reducing acceleration and velocity, especially in the case of more powerful automobiles, unless this is the only gear of the gearbox, as is the case for most current BEVs;

Immediately after the above described acceleration phase, the throttle/accelerator pedal may be fully released and the automobile may be left to decelerate down the rev range with the selected gear engaged during the acceleration phase;

During the run, the program calculates through equations (8) and, (1) or (14) or (17) or (21) depending on the specific case as discussed, and maps the wheel horsepower Vs time and/or Vs velocity and/or Vs engine speed and the automobile horsepower Vs time and/or Vs velocity and/or Vs engine speed, respectively. Maximum wheel and automobile horsepower figures can be identified from the above two sets of graphs. It is noted that the conversion of a horsepower Vs velocity graph to a horsepower Vs engine speed graph, may be readily performed, as the velocity (in km/h, or miles/h, or m/s) per 1,000 rpm achieved by the gear employed may be optionally entered by the user into the program, as given by the automobile manufacturer and the relevant automotive literature.

It is evident that, if the user of the device is interested to measure only the automobile horsepower and equations (14) or (17) or (21) are the appropriate ones, as discussed above, he/she needs to enter into the program only the parameters: a) m, and b) the velocity achieved by the automobile per 1,000 rpm for the gear to be selected, the latter parameter again needed only if the mapping of automobile horsepower Vs engine speed is required by the user.

In addition, if the measuring device has a real-time connection with weather mobile applications, something very common, for example for a smartphone, then the user does not need to enter the value of d, as the program may calculate it based on a simple embedded algorithm utilizing the values of necessary ambient weather parameters.

Finally, the program may correct according to the preferred standard (e.g., SAE 31349) the calculated wheel and/or automobile horsepower figures and display the maximum corrected respective figures. This correction is valid if the automobile is powered by an ICE; in the cases of HEVs or BEVs it is not valid, for reasons evident to those skilled in the art.

The following has to be noted for the case of BEVs powered by more than one electric motor, e.g. by a front and a rear motor: such motors may rotate at different speeds at each point in time, therefore the mapping of horsepower Vs engine speed may be performed for each electric motor separately, according to an embodiment. Accordingly, in this case it is necessary to input the velocity achieved by the automobile per 1,000 rpm of each electric motor, for the gear to be selected. The program will therefore map the combined horsepower of the electric motors Vs the engine speed of each electric motor. It is anticipated that, in the near future, such automobiles will capture a significant market share of new automobile sales.

An Embodiment of the Invention on Chassis Dynamometers

There are certain chassis dynamometer manufacturers who, recognizing the inaccuracy of horsepower measurement at the crankshaft, measure and announce horsepower only at the wheels. In fact, the second most popular chassis dynamometer marque in the US, Mustang Dynamometers, belongs to this category of chassis dynamometers.

What is particularly interesting in recent versions of chassis dynamometers of this marque with respect to the present invention, is that deceleration may be performed not only in neutral, but also in the gear engaged during acceleration. This is possible because rollers of such recent versions are of low inertia and, therefore, exert a smaller resistance to the spinning of the automobile wheels. Other chassis dynamometers incorporate massive rollers that disallow the deceleration in gear for a measurable time period, thus the engine shuts off very fast when the automobile is left to decelerate in gear. Therefore, deceleration on such other chassis dynamometers may be performed only in neutral. It is repeated, however, that even recent versions of the popular marque referred to, measure and announce horsepower only at the wheels, as they do not incorporate the mechanical efficiency concept that would allow accurate horsepower measurement at the crankshaft as described next.

As already mentioned, chassis dynamometers measure, through the connected software, torque exerted on their rollers by the automobile's wheels during both acceleration and deceleration. Horsepower, P and Torque, T exerted on a spinning axle/roller are given by the equation:

$$P = T\omega, \quad (22)$$

wherein $\omega$ is the angular velocity of the axle/roller.

During acceleration and deceleration of the automobile, on these recent versions of the abovementioned popular marque of chassis dynamometers, the following equations respectively hold true:

$$T_w - T_f = T_{acc} \quad (23)$$

$$T_d + T_p + T_f = T_{dec} \quad (24)$$

wherein the subscripts w, f, d, p, f, acc and dec have the meaning given in the rest of this specification. Especially f denotes the rolling friction between the automobile tires and dynamometer rollers incorporating resistances due to the rollers' inertia.

Adding up equations (23) and (24) and taking into account that, for each and every value of $\omega$, $T_e$=ME/(1-ME) $T_p$ in direct correspondence with what was stated in prior sections, we finally get the sought equation:

$$T_e = ME(T_{acc} + T_{dec}), \quad (25)$$

wherein $T_e$ is the torque developed by the automobile's powerplant, i.e. at the crankshaft/or at the rotor shaft(s)/or by the hybrid powerplant.

Although the invention has been described with specific embodiments it should be understood that many other embodiments may be envisaged by those skilled in the art to which the present invention pertains without departing from the scope or spirit of the present invention as defined by the following claims.

What is claimed is:

1. A method for measuring automobile horsepower, for an internal combustion engine or hybrid automobile having a four-stroke engine not incorporating the cylinder deactivation technology, the method comprising:
    steadily mounting into the automobile a mobile device including GPS connection, an accelerometer and a mobile device application operatively coupled to each other,
    performing an acceleration phase by accelerating the automobile in real road conditions on a flat and horizontal road with a selected gear and measuring using the accelerometer acceleration and velocity of the automobile during the acceleration phase of the automobile,
    immediately after acceleration phase of the automobile, performing a deceleration phase by decelerating the automobile in real road conditions with the same selected gear as the one used during the acceleration phase of the automobile and measuring using the accelerometer deceleration and velocity of the automobile during the deceleration phase of the automobile, and
    calculating automobile horsepower $P_e$ using the mobile device application and measured acceleration, deceleration and velocity during the acceleration and deceleration phases according to the following equation:

$$P_e = ME mv[dv/dt(\text{acc}) + dv/dt(\text{dec})]$$

wherein: ME is the mechanical efficiency of the automobile powerplant, m is the total mass of the automobile including passengers and cargo, v is the measured automobile velocity, dv/dt(acc) is the measured automobile acceleration, dv/dt(dec) is the measured automobile deceleration, and t is time.

2. The method according to claim 1, wherein the ME values for different types of powerplants have as follows:
    naturally aspirated gasoline engine: 0.85
    turbocharged gasoline engine: 0.91
    supercharged gasoline engine: 0.89
    naturally aspirated diesel engine: 0.89
    turbocharged diesel engine: 0.94
    hybrid, naturally aspirated gasoline engine: 0.87
    hybrid, turbocharged gasoline engine: 0.94
    hybrid, supercharged gasoline engine: 0.93
    hybrid, turbocharged diesel engine: 0.96.

3. A method for measuring automobile horsepower; from the measured automobile torque on a chassis dynamometer for an internal combustion engine or hybrid automobile having a four-stroke engine not incorporating the cylinder deactivation technology, on chassis dynamometers on which deceleration is possible with the same selected gear as the one with which acceleration on these chassis dynamometers is performed, the method comprising:
    performing an acceleration phase by accelerating the automobile on the rollers of the chassis dynamometer with a selected gear and measuring a first resultant torque exerted on the rollers of the chassis dynamometer during the acceleration phase of the automobile;
    immediately after the acceleration phase of the automobile, performing a deceleration phase by decelerating the automobile on the rollers of the chassis dynamometer with the same selected gear as the one used during the acceleration phase of the automobile and measuring a second resultant torque exerted on the rollers of the chassis dynamometer during the deceleration phase of the automobile; and calculating automobile torque $T_e$ using the first and second resultant torque according to the following equation:

$$T_e = ME(T_{acc} + T_{dec}),$$

wherein ME is the mechanical efficiency of the automobile powerplant, $T_{acc}$ is the first resultant torque and $T_{dec}$ is the second resultant torque.

4. The method according to claim 3, wherein the ME values for different types of powerplants have as follows:
naturally aspirated gasoline engine: 0.85
turbocharged gasoline engine: 0.91
supercharged gasoline engine: 0.89
naturally aspirated diesel engine: 0.89
turbocharged diesel engine: 0.94
hybrid, naturally aspirated gasoline engine: 0.87
hybrid, turbocharged gasoline engine: 0.94
hybrid, supercharged gasoline engine: 0.93
hybrid, turbocharged diesel engine: 0.96.

\* \* \* \* \*